Nov. 1, 1955 F. G. HIESTER 2,722,219
ELECTRICALLY OPERATED BEAK-CUTTING DEVICE
Filed May 28, 1953 2 Sheets-Sheet 1

Frederick G. Hiester
INVENTOR.

Nov. 1, 1955 F. G. HIESTER 2,722,219
ELECTRICALLY OPERATED BEAK-CUTTING DEVICE
Filed May 28, 1953 2 Sheets-Sheet 2

Frederick G. Hiester
INVENTOR.

BY *Clarence A. O'Brien*
*and Harvey B. Jacobson*
Attorneys

United States Patent Office 2,722,219
Patented Nov. 1, 1955

2,722,219
ELECTRICALLY OPERATED BEAK-CUTTING DEVICE

Frederick G. Hiester, Holsopple, Pa., assignor to Hiester Supply Company, Hooversville, Pa., a corporation of Pennsylvania Application May 28, 1953, Serial No. 358,124

1 Claim. (Cl. 128—305)

This invention relates to devices for trimming beaks of chickens and other types of poultry and comprises means for electrically operating a beak trimmer as described and disclosed in Patent No. 2,385,633 to James Lyon, issued September 25, 1945.

The primary object of this invention resides in the provision of electromagnetically actuated means for operating the moving cutter element of the beak cutting device, thereby eliminating the necessity for a foot- or hand-actuated treadle, and enabling an operator to more speedily and efficiently trim and cauterize the beak portion of fowls.

It is usually a comparatively inconvenient operation to cut the beak of a chicken using existing equipment. This is because it is necessary to securely hold the fowl while actuating the movable cutting element relative to the anvil on which the fowl's beak rests. Any excess movement of the fowl during the beak-cutting operation will either severely mar the beak of the fowl or will prevent the means for actuating the movable beak-cutting mechanism for being properly activated. That being the case, it is one of the important advantages of this invention to provide a simple switching means for controlling flow of current through a solenoid which actuates the movable beak-cutting element through suitable linkage.

Still further objects and features of the invention reside in the provision of means for electrifying a beak-cutting mechanism in such manner as to more easily enable an operator to operate on poultry and the like, thereby decreasing the time and effort necessary to properly care for the poultry and substantially reducing "picking" and the like whereby fowl injure each other, which electrically actuated mechanism is strong and durable, simple in construction and manufacture, and capable of being readily and easily utilized in conjunction with various existing beak-cutting mechanisms.

These, together with the various ancillary objects and features of the invention which will become apparent as the following description proceeds, are attained by this electrically actuated beak-cutting device, a preferred embodiment of which has been shown in the accompanying drawings by way of example only, and wherein.

Figure 1:
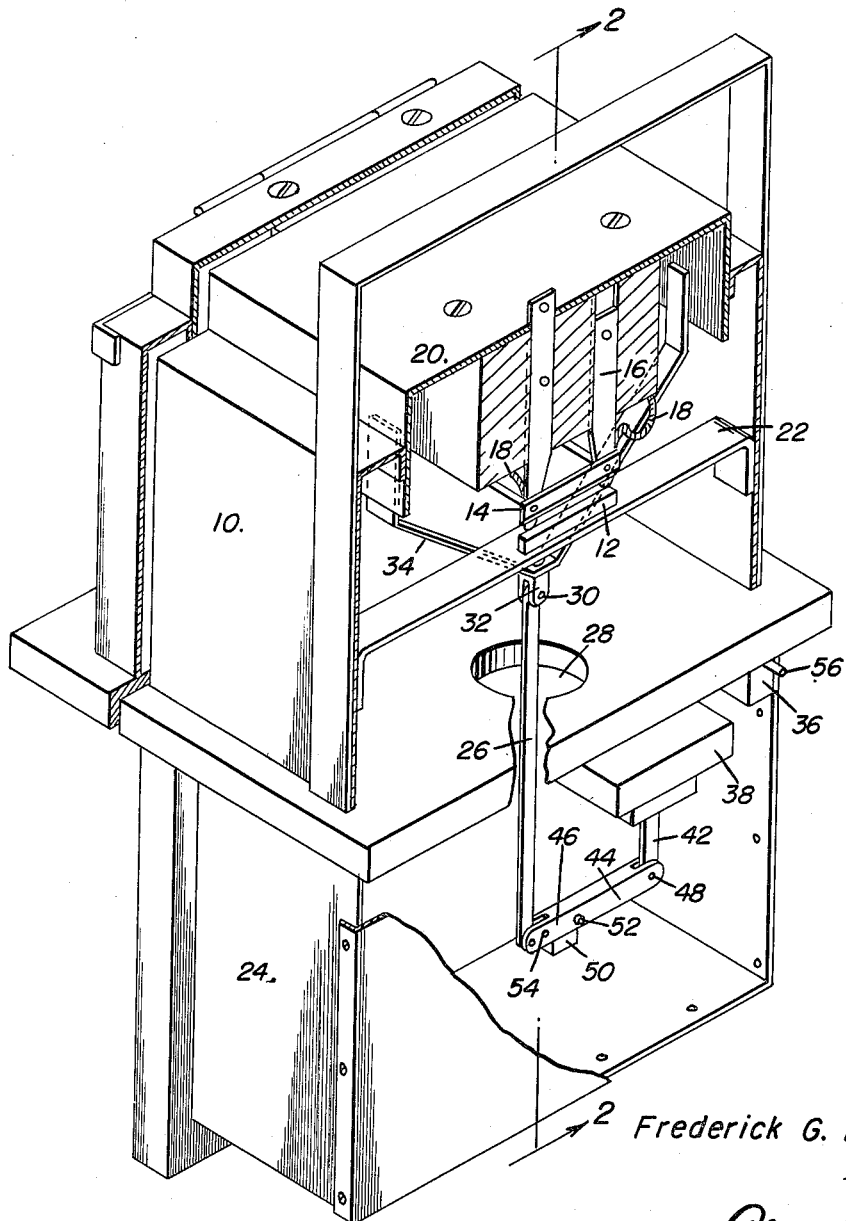
Figure 1 is a perspective view illustrating the mechanism for actuating the beak-cutting device with parts of the casing thereof being broken away to show other parts in detail.
Figure 2:
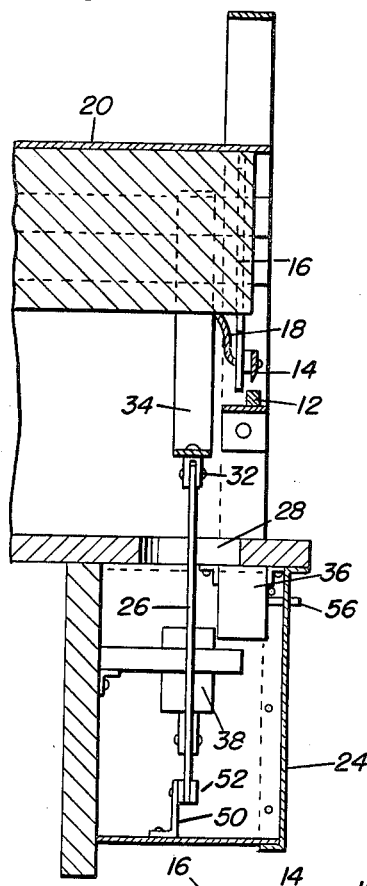
Figure 2 is a sectional detail view as taken along the plane of line 2—2 in Figure 1.
Figure 3:
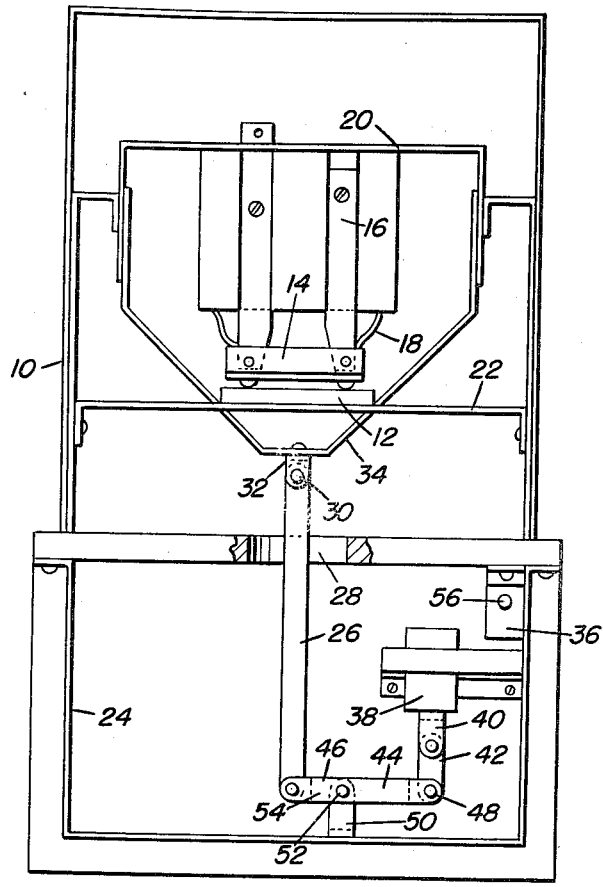
Figure 3 is a front elevational view of the electric means for actuating the movable cutter element.
Figure 4:
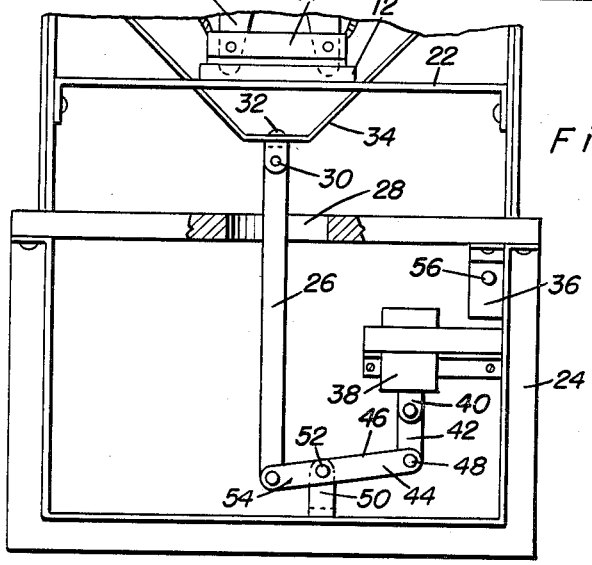
Figure 4 is a front elevational view similar to that shown in Figure 3 but showing the device in an actuated position.

With continuing reference to the accompanying drawings wherein like reference numerals designate similar parts throughout the various views, the reference numeral 10 generally designates a conventional beak-cutting and trimming device having an anvil 12 which may be water cooled as desired and which is adapted to be contacted by a movable cutter blade 14 connected to a spring-actuated mounting 16. The cutting blade 14 is connected by suitable conductors 18 through a source of electrical power for heating the blade 14 to cauterize any wound formed in the beak of the fowl. It is to be noted that the beak-cutting mechanism is mounted on a movable member 20 while the anvil is secured to a fixed plate 22.

The device comprising the present invention consists of a casing 24 which is attached to and which depends from the beak-cutting mechanism 10. The casing 24 has an operating rod 26 extending upwardly therethrough and further extends through an aperture 28 formed in the base of the beak-cutting mechanism 10. The actuating member 26 is pivotally connected by means of a pin 30 between the bifurcated portions of a connecting link 32 which is connected to a substantially V-shaped member 34 welded or otherwise attached to the movable member 20.

There is mounted within the casing 24 a micro-switch 36 which actuates a solenoid 38 controlling the movement of a core member 40 which is connected by a pivoted link 42 to the longer end 44 of an eccentrically mounted crank arm 46. A pin 48 is used to connect the crank arm portion 44 to the link 42. The crank arm 46 is eccentrically mounted upon a standard 50 secured to the base of the casing 24 by means of a pin 52. The operating member 26 is pivotally attached to the shorter portion 54 of the eccentrically mounted crank arm 46. In this manner, mechanical advantage is provided transferring a long stroke of the solenoid core 40 into greater power upon the blade 14.

In operation, with the blade 14 suitably heated to cauterize any wound, it is merely necessary to place the beak of the fowl between the blade 14 and the anvil 12. Then, pressing switch 36 which is controlled by a button 56, the solenoid 38 will cause the larger arm portion 44 to be pulled upwardly, depressing the shorter arm portion 54 and thus pulling down the blade 14 relative to the anvil 12. This will instantaneously cut the beak of the fowl and cauterize any wound caused.

Since, from the foregoing, the construction and advantages of this beak-cutting device are readily apparent, a further description is believed to be unnecessary.

However, since numerous modifications will readily occur to those skilled in the art after a consideration of the foregoing specification and accompanying drawings, it is not intended to limit the invention to the precise embodiment shown and described, but all suitable modifications and equivalents may be readily resorted to which fall within the scope of the appended claim.

What is claimed as new is as follows:

A device for electrically actuating a beak-cutting device comprising a casing adapted to be positioned beneath the beak-cutting device, an operating member extending upwardly through said casing and adapted to be secured to the movable cutting member of said beak-cutting device, and electro-magnetically operated actuating means for controlling movement of said operating member, said actuating means including a crank arm, means pivotally eccentrically mounting said crank arm in said casing forming a short crank arm portion and a comparatively longer crank arm portion, a solenoid for actuating said crank arm attached to said longer crank arm portion and electrically operatively connected to a source of electrical power, switch means in said casing for controlling flow of electrical current from said source of power to said solenoid, said operating member comprising a link pivotally attached to said short crank arm portion.

References Cited in the file of this patent
UNITED STATES PATENTS

| | | |
|---|---|---|
| 2,266,536 | Cooper | Dec. 16, 1941 |
| 2,359,569 | Lyon | Oct. 3, 1944 |
| 2,384,875 | Barton | Sept. 18, 1945 |
| 2,385,633 | Lyon | Sept. 25, 1945 |